United States Patent
Yamaguchi (10) Patent No.: US 12,176,194 B2
(45) Date of Patent: Dec. 24, 2024

(54) ANALYSIS DEVICE (71) Applicant: SHIMADZU CORPORATION, Kyoto (JP)

(72) Inventor: Shinichi Yamaguchi, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 387 days.

(21) Appl. No.: 17/620,515

(22) PCT Filed: Sep. 13, 2019

(86) PCT No.: PCT/JP2019/036132
§ 371 (c)(1),
(2) Date: Dec. 17, 2021

(87) PCT Pub. No.: WO2021/049011
PCT Pub. Date: Mar. 18, 2021

(65) Prior Publication Data
US 2022/0359176 A1 Nov. 10, 2022

(51) Int. Cl.
H01J 49/00 (2006.01)
G06V 10/44 (2022.01)
(Continued)

(52) U.S. Cl.
CPC .......... *H01J 49/0004* (2013.01); *G06V 10/44* (2022.01); *H01J 49/0036* (2013.01);
(Continued)

(58) Field of Classification Search
CPC ...... H01J 49/0004; H01J 49/027; H01J 37/22; H01J 37/222; H01J 37/26; H01J 49/00;
(Continued)

(56) References Cited

U.S. PATENT DOCUMENTS

2017/0356889 A1\* 12/2017 Nakakimura ....... H01J 49/0036
2018/0073961 A1 3/2018 Sawada
(Continued)

FOREIGN PATENT DOCUMENTS

| JP | 2009-066088 A | 4/2009 |
| WO | 2016/163385 A1 | 10/2016 |
| WO | 2017/002226 A1 | 1/2017 |

OTHER PUBLICATIONS

Broersen, Feature visualization in large scale imaging mass spectrometry data [Phd Thesis], 2009 [retrieved Aug. 24, 2024], Technische Universiteit Eindhoven, 152 pages. Retrieved: https://research.tue.nl/en/publications/feature-visualization-in-large-scale-imaging-mass-spectrometry-da (Year: 2009).\*

(Continued)

*Primary Examiner* — Matthew C Bella
*Assistant Examiner* — Dennis Rosario
(74) *Attorney, Agent, or Firm* — Sughrue Mion, PLLC (57) ABSTRACT

An analysis device collects data by performing a predetermined analysis on each specimen and processes the data. The analysis device includes an analysis processing unit (23) configured to execute multivariate analysis processing based on collected data for analysis of a difference between a plurality of measurement targets or classification of the plurality of measurement targets, a feature extraction unit (24) configured to extract a characteristic parameter or element estimated to be mainly related to a difference or classification from a multivariate analysis result according to a predetermined criterion, an image creation unit (25) configured to create an image of a predetermined two-dimensional range corresponding to the parameter or element extracted by the feature extraction unit, and a display processing unit (26) configured to assign a same visual aspect to the characteristic parameter or element extracted on the multivariate analysis result and the image created (Continued)

correspondingly and display the multivariate analysis result and the image on a display unit (4).

3 Claims, 4 Drawing Sheets

(51) Int. Cl.
*H01J 49/26* (2006.01)
*G06V 10/77* (2022.01)
*G06V 20/69* (2022.01)

(52) U.S. Cl.
CPC .......... *H01J 49/26* (2013.01); *G06F 2218/08* (2023.01); *G06T 2207/10056* (2013.01); *G06V 10/77* (2022.01); *G06V 20/69* (2022.01); *G06V 20/698* (2022.01)

(58) Field of Classification Search
CPC ...... H01J 49/26; H01J 49/0036; G01N 30/72; Y10T 436/24; G06V 20/69; G06V 2201/03; G06V 10/40; G06V 10/7715; G06V 40/172; G06V 20/698; G06V 20/693; G06V 20/695; G06V 10/44; G06V 10/77; G06V 10/757; G06V 10/762; G06F 2218/08; G06F 18/213; G06F 18/24; G06T 7/0012; G06T 2207/10056; G06T 2207/30004; G06T 2207/30024; G06T 7/97; G06T 7/33; G06T 2207/10061; G06T 2207/20081; A61B 5/0075; G01J 3/2823; G01J 2003/2826

See application file for complete search history.

(56) References Cited

U.S. PATENT DOCUMENTS

2018/0197726 A1\* 7/2018 Yamaguchi ............. G06F 17/18
2021/0035790 A1\* 2/2021 Nakakimura ....... H01J 49/0004

OTHER PUBLICATIONS

"The data analysis of IMAGEREVEALTM MS mass spectrometry imaging can be simplified as desired", [online], Shimadzu Corporation, [searched on Jul. 3, 2019], Internet.
David Calligaris et al., "Mass spectrometry imaging as a tool for surgical decision-making", Journal of Mass Spectrometry, Nov. 2013, pp. 1178-1187, vol. 48, Iss. 11.
International Search Report of PCT/JP2019/036132 dated Oct. 21, 2019 [PCT/ISA/210].
Written Opinion of PCT/JP2019/036132 dated Oct. 21, 2019 [PCT/ISA/237].
Chinese Office Action issued Feb. 29, 2024 in Application No. 201980097569.5.

\* cited by examiner

Fig. 1

Fig. 3A
OPTICAL MICROSCOPIC IMAGE

Fig. 3B
PCA RESULT

Fig. 3C
MS IMAGE

PLURALITY OF SAMPLES IN
DIFFERENCE ELUTION TIME RANGES
DERIVED FROM ONE SPECIMEN

ANALYSIS DEVICE

CROSS REFERENCE TO RELATED APPLICATIONS

This application is a National Stage of International Application No. PCT/JP2019/036132, filed Sep. 13, 2019.

TECHNICAL FIELD

The present invention relates to an analysis device which collects data by performing predetermined analysis on a specimen or an object and performs multivariate analysis processing based on the collected data.

BACKGROUND ART

In recent years, multivariate analysis, which is one of statistical analysis methods, has been actively used for analysis of data obtained by various analysis devices such as a mass spectrometer, a chromatograph, and an optical analysis device. In particular, in the field of mass spectrometry imaging, mass spectrum data of signal intensity over a wide mass-to-charge ratio range is obtained at each point of a large number of measurement points in a measurement space. Hence, in general, the amount of data is enormous, and multivariate analysis is a very useful method for extracting significant information from the enormous data.

For example, Non Patent Literature 1 discloses data analysis software having a function of: comparing a reference image such as a stained image of a specimen such as a biological tissue section with an MS image showing a signal intensity distribution at each mass-to-charge ratio m/z obtained by an imaging mass spectrometer; extracting a mass-to-charge ratio showing a two-dimensional distribution similar to the reference image; and displaying an MS image at the extracted mass-to-charge ratio. For searching a similar image, as described in Patent Literature 1 and the like, it is possible to use, for example, regression analysis by partial least square (PLS) using data constituting the reference image as an objective variable and mass spectrometry imaging data as an explanatory variable.

When a user sets a plurality of regions of interest on a stained image (optical microscopic image) of a specimen such as a biological tissue section, mass spectrum data in each of the plurality of regions of interest is analyzed by a method such as principal component analysis, and a mass-to-charge ratio value that characterizes a difference between the regions of interest, that is, a biomarker is often searched. In a principal component analysis, a score plot and a loading plot are created, and each plot on the loading plot corresponds to a parameter of a mass spectrum, that is, a mass-to-charge ratio value. Therefore, in general, the user checks the loading plot, selects the mass-to-charge ratio estimated to contribute to the difference between the regions of interest, and displays a mass spectrometry image of the mass-to-charge ratio.

CITATION LIST

Patent Literature

Patent Literature 1: WO 2017/002226 A
Patent Literature 2: WO 2016/163385 A

Non Patent Literature

Non Patent Literature 1: "The data analysis of IMAGER-EVEAL™ MS mass spectrometry imaging can be simplified as desired", [online], Shimadzu Corporation, [searched on Jul. 3, 2019], Internet

SUMMARY OF INVENTION

Technical Problem

However, in a conventional imaging mass spectrometer, it is necessary for a user to specify a plot by determining which plot is characteristic to a differential analysis, for example, on a loading plot. An operation involving such determination is a burden on the user, and there is a problem that certain degrees of experience and skill are required to perform analysis. In addition, there is also a problem that, when a plurality of plots estimated to be associated with different features are designated on a loading plot and MS images at mass-to-charge ratios corresponding to the plots are displayed, it is difficult to grasp a relationship indicating which plots on the loading plot the plurality of MS images correspond.

Such problems occur not only in imaging mass spectrometers but also in analysis devices that perform other imaging analyses such as Raman spectroscopic imaging and infrared spectroscopic imaging. In addition, there is a similar problem even in the same mass spectrometry imaging method, as in an analysis device configured to prepare samples by arranging (sticking) specimen microscopic sections, respectively collected from different measurement points on a specimen, on a sample plate so as to maintain two-dimensional positional information on the biological specimen and sequentially perform mass spectrometry on the samples derived from the respective specimen microscopic sections instead of directly performing two-dimensional mass spectrometry on biological tissue sections or the like as in the device described in Patent Literature 1.

The present invention has been made to solve such problems and has as its main object to provide the user with useful information based on a multivariate analysis result in an easily understandable manner while omitting a troublesome determination that requires complicated work, experience, and the like of the user in an analysis device that performs a multivariate analysis processing on the basis of data obtained by performing a predetermined analysis on a specimen.

Solution to Problem

An analysis device according to one aspect of the present invention which is made to solve the above problem is an analysis device which collects data by performing predetermined analysis on each specimen and processes the data. The analysis device includes:

an analysis processing unit configured to execute multivariate analysis processing based on collected data for analysis of a difference between a plurality of measurement targets or classification of the plurality of measurement targets;

a feature extraction unit configured to extract a characteristic parameter or element estimated to be mainly related to the difference or the classification from a result of the multivariate analysis processing according to a predetermined criterion;

an image creation unit configured to create an image of a predetermined two-dimensional range corresponding to the parameter or element extracted by the feature extraction unit; and a display processing unit configured to assign a same visual aspect to the characteristic parameter or element extracted on the multivariate analysis result and the image created by the image creation unit correspondingly and display the multivariate analysis result and the image on a display unit.

Advantageous Effects of Invention

The analysis device according to the above aspect of the present invention is typically an imaging analysis device such as an imaging mass spectrometer, a Raman spectroscopic imaging device, or an infrared spectroscopic imaging device. However, the image is not necessarily an image corresponding to a two-dimensional region on a specimen and can be applied to, for example, various analysis devices in which it is beneficial to perform multivariate analysis on data obtained by analyzing a specimen placed at each of two-dimensional lattice positions on a sample plate or data virtually arranged at each of such two-dimensional lattice positions and create an image with a specific parameter value on the basis of the analysis result.

In this case, the multivariate analysis processing can include principal component analysis and partial least squares regression analysis.

The "visual aspect" as used in this case includes, in addition to a display color, the luminance of a specific color, the brightness of a specific color, and the like.

When the analysis device according to the above aspect of the present invention is an imaging mass spectrometer and the multivariate analysis is a principal component analysis, a result of the multivariate analysis processing is a loading plot, and a feature extraction unit can extract, from the loading plot, a characteristic plot estimated to be mainly related to the difference or classification of the measurement target. An image creation unit can create an MS image corresponding to the one or more extracted plots, and the display processing unit can assign a same display color to the plot extracted on the loading plot and the MS image and display the loading plot and the MS image on the display unit.

The analysis device according to the above aspect of the present invention can display and allows the user to check an image corresponding to a characteristic parameter or element without requiring the user to determine a parameter or element that characterizes the difference or classification in the analysis or classification of the difference by multivariate analysis. Furthermore, even in a case in which there are a plurality of features for difference and classification, the user can grasp at a glance which image is associated with the parameter or element corresponding to each feature on the display. This makes it possible to provide the user with useful information based on the multivariate analysis result in an easily understandable manner while omitting a troublesome determination that requires complicated work, experience, and the like of the user.

DESCRIPTION OF EMBODIMENTS

An imaging mass spectrometer as an embodiment of an analysis device according to the present invention will be described with reference to the accompanying drawings.

[Configuration of Device According to Present Embodiment]

Figure 1:
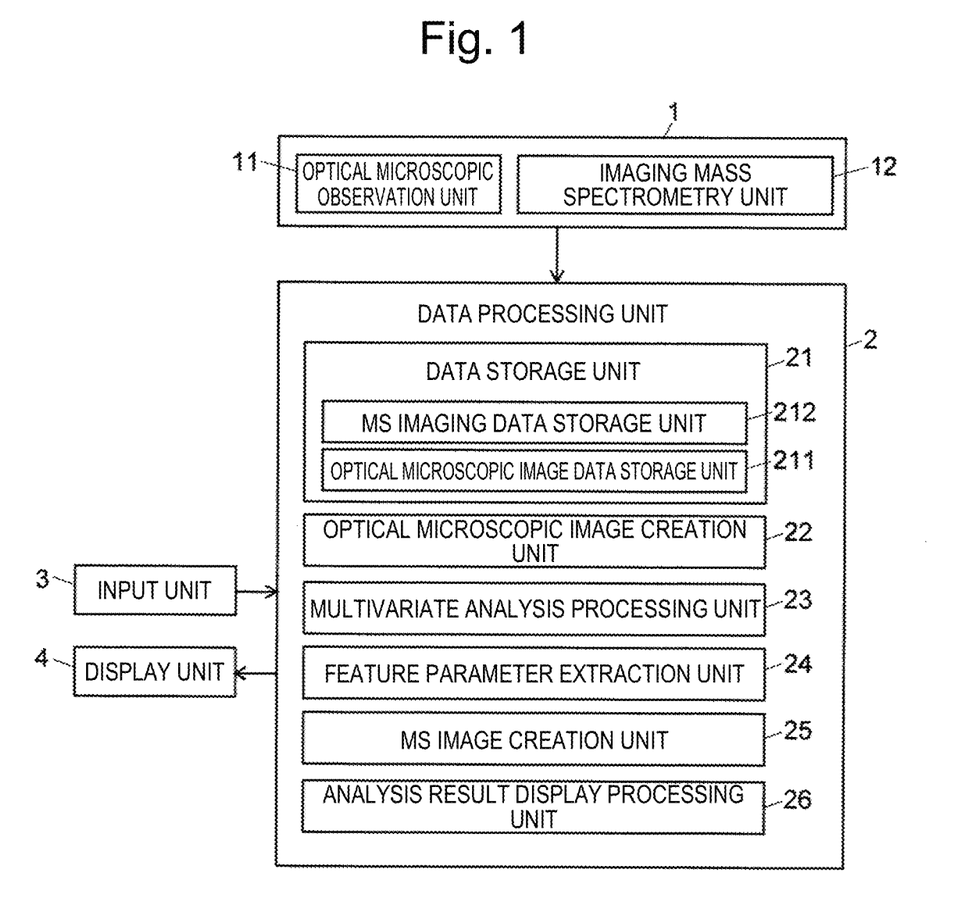
FIG. 1 is a configuration diagram of a main part of an imaging mass spectrometer as an embodiment of an analysis device according to the present invention.

FIG. 1 shows a main part of an imaging mass spectrometer according to the present embodiment.

This device includes a measurement unit 1 including an optical microscopic observation unit 11 and an imaging mass spectrometry unit 12, a data analysis unit 2, an input unit 3, and a display unit 4.

The optical microscopic observation unit 11 acquires an optical microscopic image of a measurement region on a specimen. The imaging mass spectrometry unit 12 performs mass spectrometry over a predetermined mass-to-charge ratio range for each of a large number of measurement points (minute regions) two-dimensionally set in the measurement region on the same specimen and collects mass spectrum data for each of the measurement points. In this case, the imaging mass spectrometry unit 12 is a matrix-assisted laser desorption/ionization (MALDI) ion trap time-of-flight mass spectrometer. However, the imaging mass spectrometry unit 12 is not limited to this and may use a triple quadrupole mass spectrometer equipped with a MALDI ion source, a quadrupole-time-of-flight mass spectrometer, an LDI ion source other than the MALDI ion source, a SALDI ion source, or the like. In addition, this unit may not be required to be capable of MS/MS analysis.

The data analysis unit 2 includes, as functional blocks, a data storage unit 21 including an optical microscopic image data storage unit 211 in which optical microscopic image data is stored and an MS imaging data storage unit 212 in which mass spectrum data acquired by the imaging mass spectrometry unit 12 is stored, an optical microscopic image creation unit 22, a multivariate analysis processing unit 23, a feature parameter extraction unit 24, an MS image creation unit 25, and an analysis result display processing unit 26.

Note that, in general, the entity of the data analysis unit 2 is a personal computer or a higher-performance computer, and the functions of the respective units can be implemented by executing dedicated analysis software installed in the computer by the computer.

[Characteristic Analysis Processing in Device According to Present Embodiment]

Figure 2:
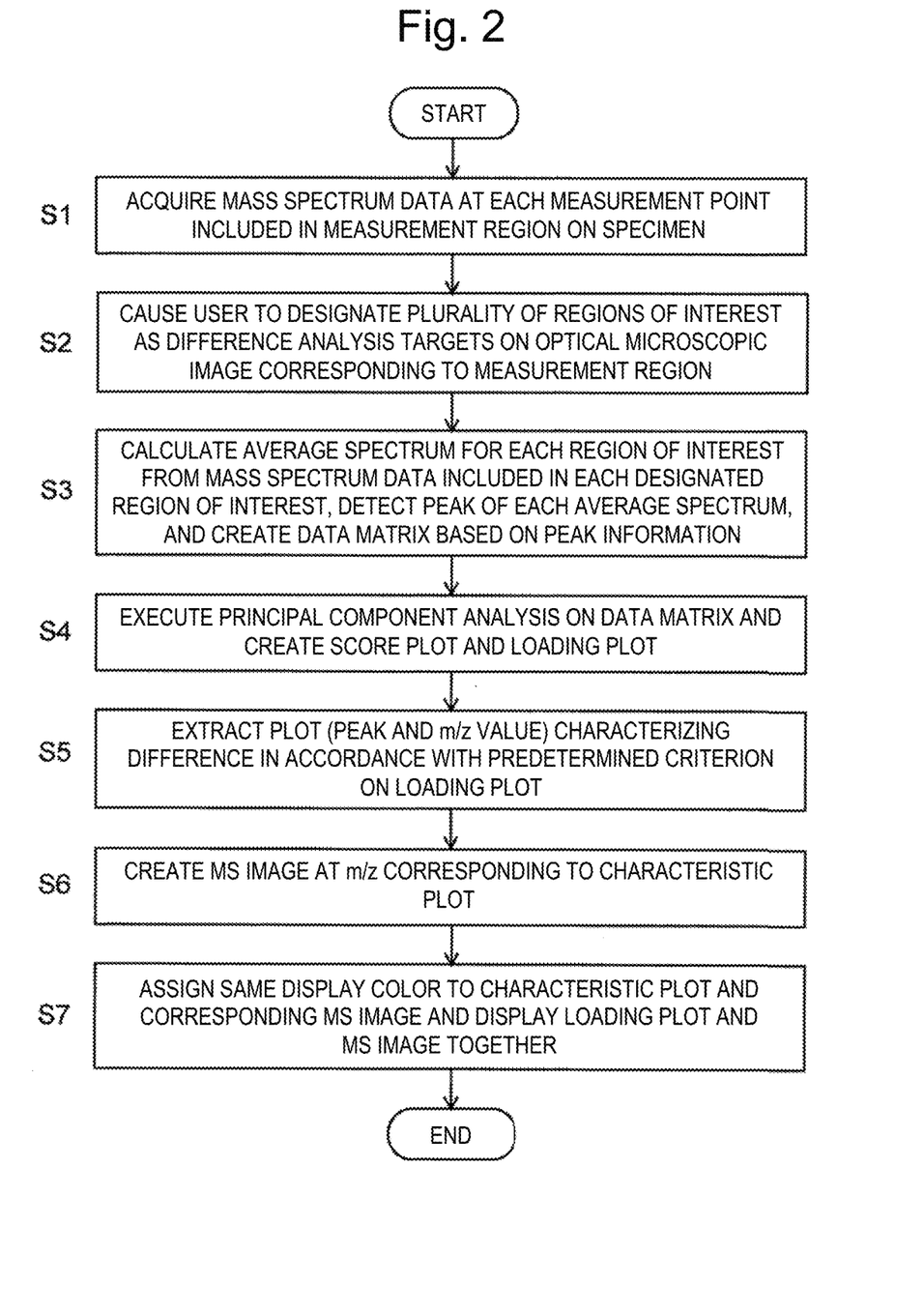
FIG. 2 is a flowchart showing an analysis procedure in the imaging mass spectrometer according to the present embodiment.
Figure 3A:
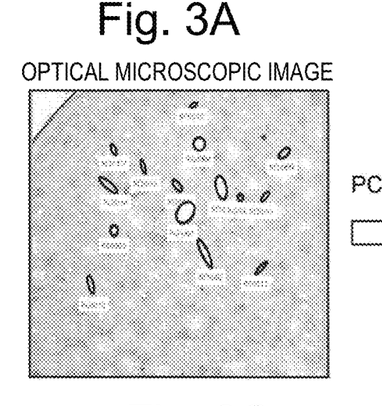
FIGS. 3A to 3C are explanatory diagrams of analysis processing in the imaging mass spectrometer according to the present embodiment.
Figure 3B:
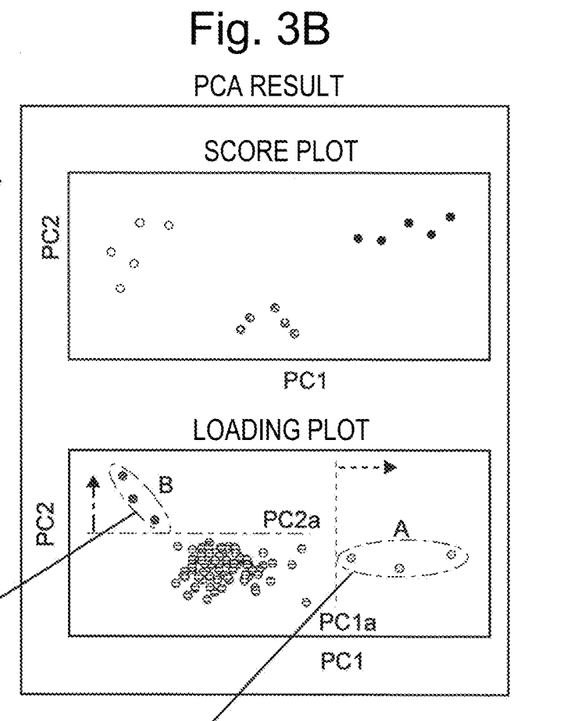
Figure 3C:
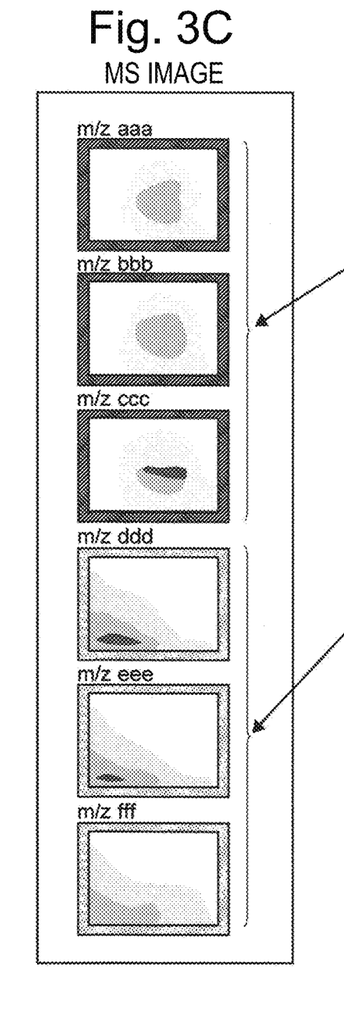

FIG. 2 is a flowchart showing an example of analysis processing procedure in the imaging mass spectrometer according to the present embodiment. FIGS. 3A to 3C are explanatory diagrams of analysis processing in the imaging mass spectrometer according to the present embodiment.

Characteristic analysis processing in the imaging mass spectrometer according to the present embodiment will be described with reference to FIGS. 2 and 3 in addition to FIG. 1.

The user sets a specimen such as a biological specimen section in the measurement unit 1. In response to an instruction from the input unit 3 by the user, the optical microscopic observation unit 11 photographs an optical microscopic image of the specimen and stores the image data in the optical microscopic image data storage unit 211 of the data storage unit 21. The optical microscopic image creation unit 22 creates an optical microscopic image on the basis of this data and displays the optical microscopic image on the display unit 4. The user sets an appropriate measurement range on the optical microscopic image by the input unit 3, further sets analysis conditions, and then gives an instruction to start the analysis. The analysis conditions include, for example, the pulse width, laser power, and irradiation diameter of an ionization laser from the MALDI ion source and the mass-to-charge ratio range of a measurement target.

Figure 4:
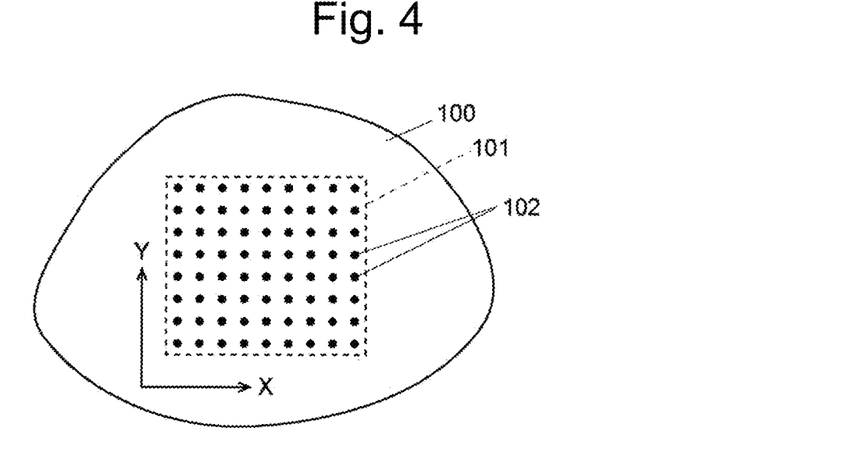
FIG. 4 is a schematic view showing measurement points at which mass spectrometry is performed on a specimen in the imaging mass spectrometer according to the present embodiment.

As shown in FIG. 4, the imaging mass spectrometry unit 12 performs mass spectrometry for each of a large number of measurement points (actually, minute regions having a size determined according to a laser irradiation diameter and the like) 102 two-dimensionally determined within a measurement range 101 designated on a specimen 100 and acquires mass spectrum data over a predetermined mass-to-charge ratio range. The thus collected mass spectrum data corresponding to each measurement point 102 is stored in the MS imaging data storage unit 212 of the data storage unit 21 (step S1).

A difference analysis between a plurality of regions of interest on the specimen is performed in the following manner based on the mass spectrum data collected as described above (hereinafter, mass spectrum data for all measurement points or some measurement points are sometimes collectively referred to as MS imaging data).

That is, when the user performs a predetermined operation on the input unit 3, the optical microscopic image creation unit 22 creates an optical microscopic image corresponding to the measurement range on the basis of the data stored in the optical microscopic image data storage unit 211 and displays the optical microscopic image on the display unit 4. The user appropriately sets a plurality of regions of interest (ROIs) on the image (step S2). FIG. 3A shows an example of a state in which a plurality of regions of interest are set on an optical microscopic image.

When the user sets a plurality of regions of interest and then instructs the execution of a difference analysis by a principal component analysis, the multivariate analysis processing unit 23 reads the mass spectrum data obtained at the measurement points included in the plurality of designated regions of interest from the MS imaging data storage unit 212. The multivariate analysis processing unit 23 then calculates, for each region of interest, an average mass spectrum or a maximum intensity mass spectrum from the mass spectrum data obtained at a plurality of measurement points included in one region of interest. The multivariate analysis processing unit 23 also performs peak detection in the average mass spectrum or the maximum intensity mass spectrum and creates a peak list by obtaining the mass-to-charge ratio and signal intensity of each peak. The multivariate analysis processing unit 23 creates a data matrix having a signal intensity value as an element by collecting the peak lists obtained in the respective regions of interest, with each number for specifying a region of interest (for example, "ROI 1" in FIG. 3A) being set in the longitudinal direction and each mass-to-charge ratio value being set in the lateral direction (obviously, the longitudinal direction and the lateral direction may be reversed) (step S3).

The multivariate analysis processing unit 23 performs a principal component analysis on the generated data matrix and generates a score plot and a loading plot as principal component analysis results (see step S4 in FIG. 3B). In a principal component analysis, the number of principal components (the number of principal component axes) is generally determined in the course of analysis. Therefore, score plots and loading plots corresponding in number to the number of principal components are obtained.

In this case, each plot on the score plot corresponds to each row of the data matrix, that is, one region of interest. Therefore, if the user has set 10 regions of interest, 10 plots are set on the score plot. If the two principal component axes (a first principal component axis PC1 and a second principal component axis PC2 in the example shown in FIG. 3B) of the score plot appropriately reflect the difference in the region of interest, usually the difference in the type and amount of the compound existing in the region of interest, the plots corresponding to similar regions of interest are close to each other, and the plots corresponding to regions of interest with a clear difference are located apart on the score plot.

In contrast to this, the loading plot is a graph having the same two principal component axes as the score plot, but each plot point corresponds to each column of the data matrix, that is, a mass-to-charge ratio value which is a parameter at the time of analysis. A loading value represents a degree of influence on a difference between regions of interest on the principal component axis. Therefore, for example, a plot indicating a large loading value on the first principal component axis PC1, that is, a mass-to-charge ratio value, has a relatively large influence on a difference between regions of interest on the first principal component axis PC1. In other words, there is a high possibility that a mass-to-charge ratio value indicating a large loading value on the first principal component axis PC1 can be used as a marker capable of determining the degree of difference between regions of interest on the first principal component axis PC1.

Accordingly, the feature parameter extraction unit 24 extracts a plot (a mass-to-charge ratio value and a peak on the mass spectrum) estimated to characterize a difference between regions of interest based on the created score plot and loading plot (step S5). More specifically, for example, a principal component contributing to a difference between regions of interest may be selected first from the relative distance of each plot on the score plot, and then a plot indicating a large loading value on the axis may be selected in the loading plot having the principal component as the axis. The number of plots to be selected on the loading plot may be determined in advance. Alternatively, when threshold values PC1a and Pc2a can be set as shown in FIG. 3B, plots may be selected with reference to the thresholds without being limited in umber.

As described above, since each of the plots on the loading plot selected in step S4 corresponds to a mass-to-charge ratio, the MS image creation unit 25 reads the signal intensity value at each measurement point corresponding to the selected mass-to-charge ratio from the MS imaging data storage unit 212 and creates an MS image of the entire measurement range for each mass-to-charge ratio (step S6). In this case, instead of the MS image of the entire measurement range, an MS image of a narrower range designated by the user within the measurement range may be created. The MS image created here is an image showing the two-dimensional distribution of markers, that is, compound candidates with high possibilities of being able to determine the degree of difference between regions of interest.

The analysis result display processing unit 26 creates a display screen combining the principal component analysis result and the plurality of MS images and displays the display screen on the display unit 4. At this time, the same display colors are assigned to a plurality of plots selected as having features exhibiting the same tendency on the loading plot, which is a principal component analysis result, and a plurality of MS images corresponding to the plots so as to associate them with each other (step S7).

For example, in the example in FIGS. 3A to 3C, in the loading plot shown in FIG. 3B, three plots that can be included in a group A with respect to the first principal component axis PC1 are selected, and three plots that can be included in a group B with respect to the second principal component axis PC2 are selected. For example, red is assigned to the three plots belonging to the group A, blue is assigned to the three plots belonging to the group B, and each of the six plots on the loading plot to be extracted is colored in red or blue. On the other hand, the three MS images corresponding to the three plots belonging to the group A are assigned with the same red color as that of the three plots, and a red frame is given around each MS image. The three MS images corresponding to the three plots belonging to the group B are assigned with the same blue color as that of the three plots, and a blue frame is given around each MS image.

With the processing as described above, it is possible to display an MS image estimated to be characteristic in analyzing a difference between regions of interest designated by the user without determination or work by the user. In addition, since each plot estimated to be significant for the differential analysis on the loading plot and an MS image are associated with each other in the same display color, the user can grasp at a glance MS images of a plurality of compounds estimated to have the same features in the differential analysis for a plurality of regions of interest and perform work such as comparison.

Note that, when a color is assigned to an MS image and the MS image is displayed in the color, it is possible to adopt various modes such as coloring the frame, tagging the color, and setting a background color to the color. That is, it is only necessary to easily visually recognize that the display color is assigned to the MS image.

When the data constituting the above MS image is stored as one data file, the color assigned to the MS image is directly assigned to the icon indicating the file or the folder in which the data file is stored so as to allow the user to easily identify the specific file or folder from others in displaying the list of files or folders.

In the above description, the difference analysis between the plurality of regions of interest on one specimen is performed, but the plurality of regions of interest can be replaced with a plurality of specimens. That is, even when a difference analysis between measurement ranges on different specimens is performed, the above-described analysis method can be directly used.

[Application to Multivariate Analysis Other than Principal Component Analysis]

Although the principal component analysis is used as the multivariate analysis in the above description, other multivariate analysis methods can also be used.

In the above-described principal component analysis, a score value and a loading value are obtained as multivariate analysis results, and for example, each loading value is a numerical value related to the characterization of a difference between regions of interest. Similarly, when partial least squares (PLS) regression analysis is used for a difference analysis between a plurality of regions of interest, a regression coefficient (regression coefficient matrix) can be obtained by the regression analysis, and the mass-to-charge ratio at which the absolute value of the regression coefficient increases is estimated to be highly related to the difference between the regions of interest.

Accordingly, similarly to the relationship between the loading plot and the MS images described above, a regression coefficient estimated to have a high contribution to the characterization of a difference between regions of interest may be extracted from a regression coefficient matrix, the regression coefficient may be colored and displayed, and the same color may be assigned to the corresponding MS image and displayed. In addition, a spectrum-like graph showing the relationship between mass-to-charge ratios and regression coefficients may be created based on the regression coefficient matrix, and a mass-to-charge ratio corresponding to a characteristic regression coefficient may be colored and shown on the graph.

[Other Modifications]

In the above embodiment, the same display color is assigned to a plot on a loading plot and an MS image corresponding to the plot. However, for example, when a mass spectrum (including an average spectrum and a maximum intensity spectrum) is displayed, the same color as the display color of the plot may be assigned to a peak of a mass-to-charge ratio corresponding to the plot on the mass spectrum. This color may not be the color of the peak itself but may be the color of a label indicating the mass-to-charge ratio value or the like of the peak. This allows the user to check at a glance which peak in the mass spectrum is a characteristic peak contributing to the difference or the classification.

Although the above embodiment is an example in which the present invention is applied to an imaging mass spectrometer, the present invention can be applied to various analysis devices capable of visualizing the distribution of substances (components) in a two-dimensional region on a specimen, such as a Raman spectroscopic imaging device and an infrared spectroscopic imaging device, other than the imaging mass spectrometer.

In addition to a device that directly analyzes a specimen itself such as a biological tissue section, a device using a method as described below is known as an analysis device that creates an image showing the distribution of substances (components) in a two-dimensional region on the specimen.

That is, Patent Literature 2 discloses a method which is a combination of a specimen collecting method called a laser microdissection (LMD) method and liquid chromatography-mass spectrometry (LC/MS). The LMD method includes a general LMD method of cutting a biological specimen with a laser beam and a specimen collecting method called a hot-melt LMD method described in Patent Literature 2.

For example, the hot-melt LMD method uses a slide glass to which a film that dissolves by heat is attached and irradiates a target site on a biological specimen with near-infrared laser light while the film and the biological specimen are in close contact with each other. When the film is irradiated with a laser beam, the film is melted, and some specimen sections at the target site (and its periphery) are attached to the dissolved film and collected on the film.

Figure 5:
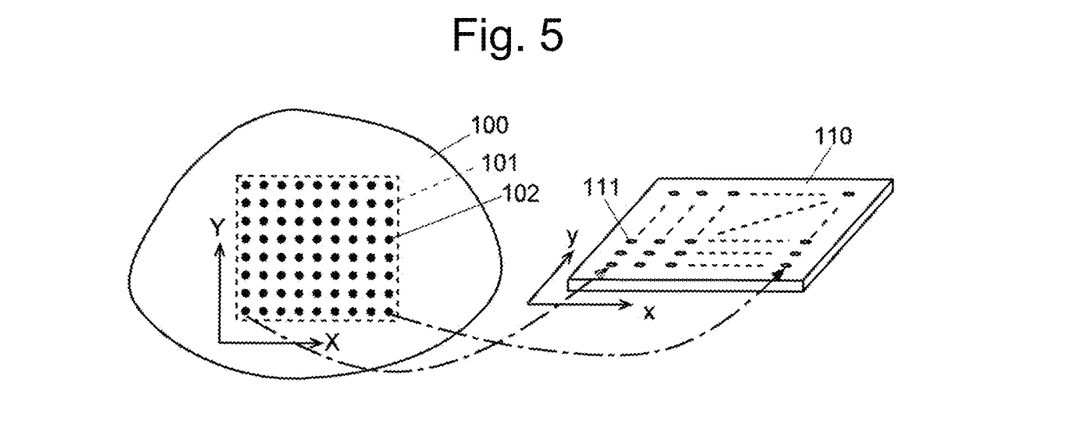
FIG. 5 is a schematic view showing the correspondence relationship between measurement points on a specimen and the sample on a sample plate in an imaging mass spectrometer according to another embodiment.

As shown in FIG. 5, specimen sections at a plurality of measurement points 102 in the two-dimensional region 101 on the biological specimen 100 are collected at distant positions on a film 110, and two-dimensional positional information of the measurement point 102 on the biological specimen is associated with two-dimensional positional information of a specimen section 111 on the film 110. A liquid specimen is prepared from each specimen section 111 collected on the film 110, and each liquid specimen is sequentially analyzed by a liquid chromatograph mass spectrometer. After mass spectrometry is performed on all the liquid specimens to acquire mass spectrum data, ionic intensity information based on the mass spectrum data is reconstructed based on the two-dimensional positional information given to each liquid specimen. This can create a two-dimensional distribution image of ionic intensity corresponding to a specific component, that is, an MS image.

As shown in FIG. 5, it is also possible to collect mass spectrum data by placing each specimen section collected from each measurement point on the specimen on a sample plate, while maintaining each positional information, and performing mass spectrometry with a mass spectrometer equipped with a MALDI ion source.

As described above, also in a case in which mass spectrometry is performed on a specimen section physically collected from each measurement point on the specimen and transferred onto another film or sample plate instead of directly performing mass spectrometry on each measurement point on the specimen, it is possible to create an MS image at a specific mass-to-charge ratio from mass spectrum data corresponding to each measurement point, which is similar to the device according to the above embodiment. Therefore, it is obvious that the present invention can also be applied to such a method or apparatus.

Furthermore, as described above, even if a large number of specimens two-dimensionally arranged on a sample plate do not correspond to measurement points on a biological specimen and each specimen is derived from another source, the present invention can be applied as long as it is meaningful to display the two-dimensional distribution of ionic intensity for each mass-to-charge ratio on the sample plate.

Figure 6:
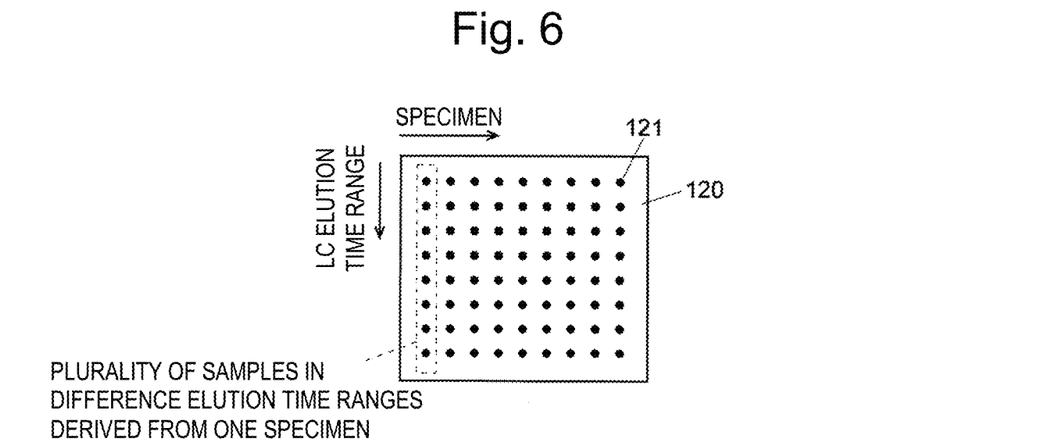
FIG. 6 is a schematic view showing an origin of each sample on a sample plate in an analysis device according to another embodiment.

For example, it is possible to obtain a sample plate 120 on which a large number of samples 121 are prepared as shown in FIG. 6 by preparing a sample by dropping, on the sample plate, the eluate obtained by fractionating each of a plurality of specimens for each of different elution time ranges by the liquid chromatograph fractionating device. When mass spectrum data is collected by performing mass spectrometry on each sample on the sample plate and an MS image having a specific mass-to-charge ratio is created based on the mass spectrum data, an image in which the abundance of a substance corresponding to the mass-to-charge ratio can be compared for each specimen can be obtained. As described above, for example, the present invention can also be applied to a case in which each sample on a sample plate is associated with a specific specimen and an MS image at a specific mass-to-charge ratio of the entire sample plate is created.

The above embodiment and the modifications each are merely an example of the present invention, and it is clear that deformation, modification, addition, and the like made as appropriate within the scope of the gist of the present invention are included in the claims of the present application at points other than the above-described points.

[Various Aspects]

It is obvious for those skilled in the art that the exemplary embodiments described above are specific examples of the following aspects.

(Clause 1) An analysis device according to one aspect of the present invention is an analysis device which collects data by performing predetermined analysis on each specimen and processes the data. The analysis device includes:
an analysis processing unit configured to execute multivariate analysis processing based on collected data for analysis of a difference between a plurality of measurement targets or classification of the plurality of measurement targets;
a feature extraction unit configured to extract a characteristic parameter or element estimated to be mainly related to the difference or the classification from a result of the multivariate analysis processing according to a predetermined criterion;
an image creation unit configured to create an image of a predetermined two-dimensional range corresponding to the parameter or element extracted by the feature extraction unit; and
a display processing unit configured to assign a same visual aspect to the characteristic parameter or element extracted on the multivariate analysis result and the image created by the image creation unit correspondingly and display the multivariate analysis result and the image on a display unit.

The analysis device described in Clause 1 can display and allows the user to check an image corresponding to a characteristic parameter or element without requiring the user to determine a parameter or element that characterizes the difference or classification in the analysis or classification of the difference by multivariate analysis. Furthermore, even in a case in which there are a plurality of features for difference and classification, the user can grasp at a glance which image is associated with the parameter or element corresponding to each feature on the display. This makes it possible to provide the user with useful information based on the multivariate analysis result in an easily understandable manner while omitting a troublesome determination that requires complicated work, experience, and the like of the user.

(Clause 2) The analysis device described in Clause 1 may be an imaging mass spectrometer, the parameter may be a mass-to-charge ratio, the multivariate analysis processing may be a principal component analysis, and the multivariate analysis result may be a loading plot. The feature extraction unit may be configured to extract a characteristic plot estimated to be mainly related to the difference or the classification from a loading plot according to a predetermined criterion, and the image creation unit may be configured to create a mass spectrometry image at a mass-to-charge ratio corresponding to the extracted plot.

According to the analysis device described in Clause 2, for example, when a difference analysis between a plurality of specimens or between a plurality of regions of interest on one specimen is performed, the same visual display mode can be assigned to a plot corresponding to a mass-to-charge ratio that characterizes the difference on the loading plot and an MS image at the mass-to-charge ratio, and the loading plot and the MS image can be displayed on the display unit. This allows the user to check the MS image characterizing the difference without selecting a characteristic plot on the loading plot by himself/herself.

(Clause 3) In the analysis device described in Clause 1 or 2, the visual aspect may be a display color.

According to the analysis device described in Clause 3, for example, the user can check at a glance a plot estimated to characterize the difference on the loading plot and an MS image corresponding to the plot.

REFERENCE SIGNS LIST

1 . . . Measurement Unit
11 . . . Optical Microscopic Observation Unit
12 . . . Imaging Mass Spectrometry Unit
2 . . . Data Analysis Unit
21 . . . Data Storage Unit
211 . . . Optical Microscopic Image Data Storage Unit
212 . . . MS Imaging Data Storage Unit
22 . . . Optical Microscopic Image Creation Unit
23 . . . Multivariate Analysis Processing Unit
24 . . . Feature Parameter Extraction Unit
25 . . . MS Image Creation Unit
26 . . . Result Display Processing Unit
3 . . . Input Unit
4 . . . Display Unit

The invention claimed is:

1. An imaging mass spectrometer which collects data by performing mass spectrometry on a specimen and processes the data, the analysis device comprising:

an analysis processing unit configured to execute multivariate analysis processing based on collected data for analysis of at least one of a difference between a plurality of measurement targets or classification of the plurality of measurement targets;

a feature extraction unit configured to extract at least one of a characteristic parameter or element estimated to be mainly related to the at least one of the difference or the classification from a result of the multivariate analysis processing according to a predetermined criterion, the parameter being a mass-to-charge ratio value and the element corresponding to a mass-to-charge ratio value;

an image creation unit configured to create a mass spectrometry image of a predetermined two-dimensional range corresponding to the at least one of the extracted characteristic parameter or extracted element by the feature extraction unit on the basis of the analysis result; and a display processing unit configured to assign a same visual aspect to the at least one of the extracted characteristic parameter or extracted element on the multivariate analysis result and the mass spectrometry image created by the image creation unit and display the multivariate analysis result and the mass spectrometry image on a display unit.

2. The imaging mass spectrometer according to claim 1, wherein the multivariate analysis processing is a principal component analysis, and the multivariate analysis result is a loading plot, the feature extraction unit is configured to extract a plurality of characteristic plots estimated to be mainly related to the at least one of the difference or the classification from a loading plot according to a predetermined criterion, and the image creation unit is configured to create a plurality of mass spectrometry images at a mass-to-charge ratio value corresponding to each of the extracted plurality of plots.

3. The imaging mass spectrometer according to claim 1, wherein the visual aspect is a display color.

* * * * *